(12) United States Patent
Frampton

(10) Patent No.: US 7,736,148 B2
(45) Date of Patent: Jun. 15, 2010

(54) METHOD OF AND MEANS FOR TEACHING ACCOUNTING CONCEPTS AND PROCEDURES

(75) Inventor: Peter Lawrence Frampton, Washington, DC (US)

(73) Assignee: Comes Alive International, Inc., Road Town (VG)

( * ) Notice: Subject to any disclaimer, the term of this patent is extended or adjusted under 35 U.S.C. 154(b) by 306 days.

(21) Appl. No.: 10/563,867

(22) PCT Filed: Jul. 8, 2004

(86) PCT No.: PCT/ZA2004/000077

§ 371 (c)(1),
(2), (4) Date: Jan. 9, 2006

(87) PCT Pub. No.: WO2005/004090

PCT Pub. Date: Jan. 13, 2005

(65) Prior Publication Data

US 2006/0172265 A1  Aug. 3, 2006

(30) Foreign Application Priority Data

Jul. 8, 2003 (ZA) .................................. 03/5246

(51) Int. Cl.
*G09B 19/18* (2006.01)
*A63F 3/00* (2006.01)

(52) U.S. Cl. ...................... 434/107; 434/109; 273/256; 463/25; 463/26

(58) Field of Classification Search ................ 434/107, 434/109; 273/256; 463/25, 26
See application file for complete search history.

(56) References Cited

U.S. PATENT DOCUMENTS

| 3,423,847 | A | 1/1969 | Barbee |
| 3,889,395 | A | 6/1975 | Zegel |
| 4,008,527 | A | 2/1977 | Zegel |
| 4,142,305 | A | 3/1979 | Zegel |
| 4,336,019 | A | 6/1982 | Schroeder |
| 6,565,609 | B1 * | 5/2003 | Sorge et al. .................. 715/234 |
| 2002/0164561 | A1 * | 11/2002 | Joffe .......................... 434/107 |

FOREIGN PATENT DOCUMENTS

DE  874 519  4/1953

\* cited by examiner

*Primary Examiner*—Kathleen Mosser
*Assistant Examiner*—Jerry-Daryl Fletcher
(74) *Attorney, Agent, or Firm*—The Nath Law Group; Derek Richmond; Jiaxiao Zhang

(57) ABSTRACT

A method of teaching accounting principles is disclosed in which two different colors are used to distinguish that which is owned and owed from that which has been used and earned. This is to establish the concept of double entry accounting. Question sets are used to distinguish assets, liabilities, income and expenditure from one another to facilitate their proper treatment in books of account. Words other than commonly accepted accounting words are used to denote accounting concepts before the teaching method moves on to using the commonly accepted accounting words.

1 Claim, 12 Drawing Sheets

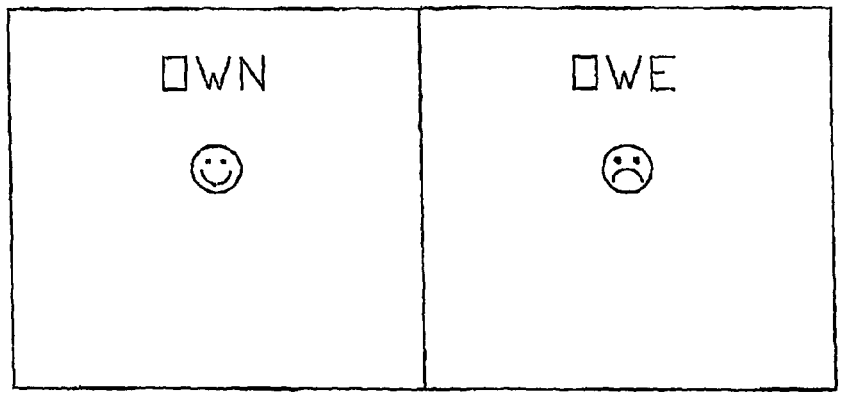
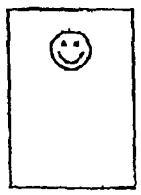 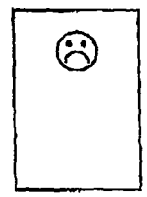
Fig. 3
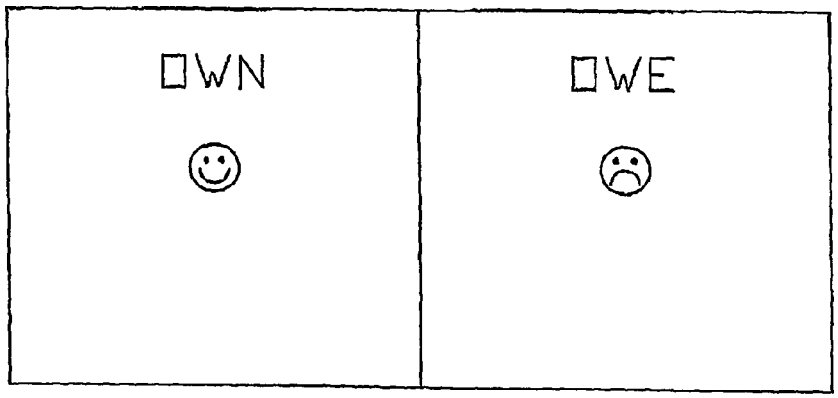
Fig. 4
| General Transaction Diary | | Special Diary 1 | Special Diary 2 | Special Diary 3 | Special Diary 4 |
|---|---|---|---|---|---|
| Diary Ref. | Description | Basket Name | Amount | Basket Name | Amount |
| | | | | | |
| | | | | | |
| | | | | | |
| | | | | | |

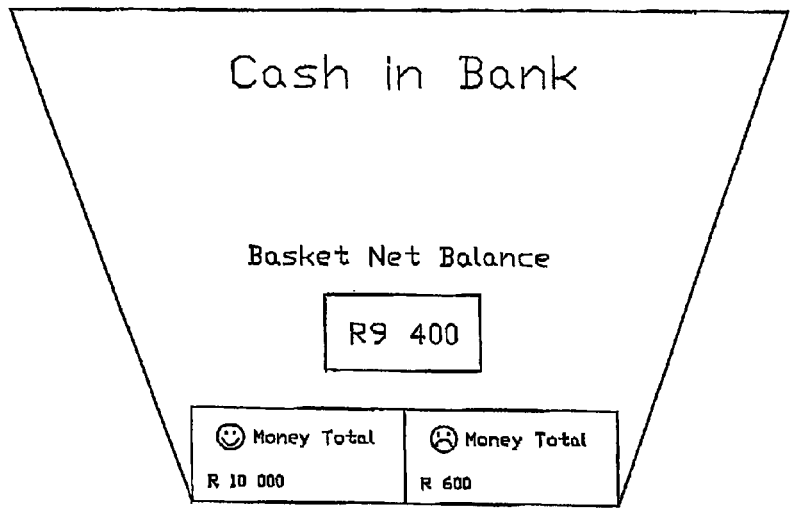

Fig. 5

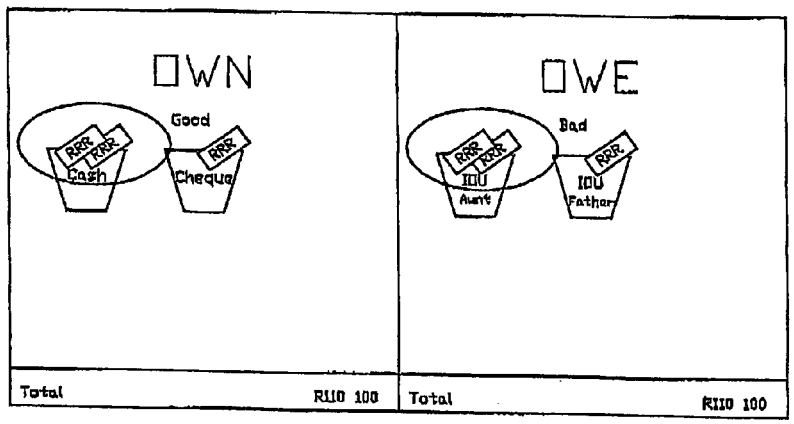

Fig. 6

| General Transaction Diary | | Special Diary 1 | | Special Diary 2 | Special Diary 3 | Special Diary 4 |
|---|---|---|---|---|---|---|
| Diary Ref. | Description | Basket Name | Amount | | Basket Name | Amount |
| 01 Jan | Borrowed R10 000 from Aunt in cash notes | Cash | R10 000 | | IOU Aunt | R10 000 |
| 02 Jan | Borrowed R100 000 from Father when deposited cheques into account | Cheque account | R100 000 | | IOU Father | R100 000 |
| 03 Jan | Buy 3 gas bottles @ R200.00 each | Equipment | R600 | | Cash | R600 |
| 04 Jan | Repay Aunt half of her loan | IOU Aunt | R5 000 | | Cash | R5 000 |

| OWN | OWE |
|---|---|
| Assets       = | Liabilities + |
| Total           R106 000 | Total           R100 000 |
| | Profit |
| | Total           R6 000 |

Fig. 9

| OWN | OWE |
|---|---|
| Cash  Cheque  Equip  Coin | IOU Aunt  IOU Father  IOU Dions  IOU XB |
| | Liabilities           R100 000 |
| | Owners Equity: Share Cap + Profit    R6 000 |
| Total           R106 000 | Total           R106 000 |

Fig. 10

Income Statement Report for January

| | |
|---|---|
| INCOME | |
| Income – Haircuts Blow-dries | R 7 000 |
| Income – Tints and perms Specials | R 5 000 |
| Sales of Hair supplies | R 1 000 |
| Total Income | R 13 000 |
| | |
| EXPENSES | |
| Flowers used | R 50 |
| Electricity and Gas used | R 110 |
| Hair Supplies used | R 275 |
| Phone card used | R 815 |
| Stationary used | R 95 |
| Rent used | R2 000 |
| Salary and wages used | R3 655 |
| Total expenses | R 7 000 |
| PROFIT | R 6 000 |

Fig. 11

Balance Sheet at 31 July

| | |
|---|---|
| ASSETS | |
| Short Term Assets | |
| Cash In Hand | R 5 000 |
| General Cheque Account | R 30 000 |
| Investment Account | R 60 000 |
| Prepaid Insurance | R 2 400 |
| Prepaid Rent | R 1 000 |
| Hair Supplies | R 500 |
| Electricity and Gas Supplies | R 400 |
| Phone cards | R 200 |
| Flowers | R 300 |
| Fixed Assets | |
| Equipment – Cost | R2 000 |
| Tools – Cost | R2 500 |
| Furniture and Fixtures – Cost | R9 500 |
| Computers – Cost | R 10 000 |
| TOTAL ASSETS | R123 800 |
| | |
| LIABILITIES | |
| IOU's – Long Terms | R60 000 |
| IOU's Aunt | R10 000 |
| IOU's Father | R50 000 |
| IOU's Short Term (Current) | R3 800 |
| TOTAL LIABILITIES | R123 800 |

Fig. 12

Year 1
Fig. 13
Year 2a
Fig. 14

Year 2b

| OWN | | OWE | |
|---|---|---|---|
| Total | R105 000 | Total | R100 000 |
| | | Last year's "retained" profit Total | R6 000 |
| | | This year (Y2) Profit | R3 000 |

Year 3a

| OWN | | OWE | |
|---|---|---|---|
| Total | R114 000 | Total | R100 000 |
| | | Previous years' "retained" profit Total | R9 000 |
| This Year (Y3) R10 000 | | Scrapyard R15 000 | |

Decision Tree 2b

METHOD OF AND MEANS FOR TEACHING ACCOUNTING CONCEPTS AND PROCEDURES

FIELD OF THE INVENTION

Disclosed is a method of and means for teaching accounting concepts and procedures.

BACKGROUND TO THE INVENTION

Double entry accounting is the only system widely used now in commerce and industry for maintaining the books of a commercial enterprise. A difficulty in teaching accounting revolves around elucidating the concepts of debit and credit. Confusion frequently arises in understanding whether the entry to be made is a debit or credit entry and where the entries are to be made in respect of a specific transaction. Confusion also arises in respect of the interpretation of financial statements where the meaning of the numbers given is not understood. The present inventive subject matter seeks to overcome difficulties involved in teaching these basic accounting concepts.

BRIEF DESCRIPTION OF THE INVENTION

There is provided a method of teaching accounting principles in which two different colors are used to distinguish that which is owned and owed from that which has been used and earned thereby; to establish the concept of double entry accounting, question sets are used to distinguish assets, liabilities, income and expenditure from one another to facilitate their proper treatment in books of account; and words other than commonly accepted accounting words are used to denote accounting concepts.

BRIEF DESCRIPTION OF THE DRAWINGS

For a better understanding of the present inventive subject matter and to show how the same may be carried into effect, reference will now be made, by way of example, to the accompanying drawings.

FIG. 3 shows the marked up version of the starting sheet of FIG. 2 in relation to bank notes, each having a different color;

FIG. 4 shows a transaction diary in relation to the marked up version of the starting sheet of FIG. 2;

FIG. 5 shows a basket for containing assets, liabilities etc.;

FIG. 6 shows the basket positioned on the marked up version of the starting sheet;

FIG. 9 is a translational presentation of the concepts of owning and owing to the more usual concepts of assets and liabilities;

FIG. 10 is a depiction of the way in which owner's equity is related to assets and liabilities;

FIG. 11 shows an income statement;

FIG. 12 shows a balance sheet;

FIG. 13 is a teaching aid for showing students that accounts are taken out and balanced at predetermined intervals;

FIGS. 14 to 17 show teaching aids that demonstrate closing balances of one accounting period versus opening balances of a subsequent accounting period;

FIG. 18 shows a decision tree that is used to elucidate a decision making process for increasing a value of a basket;

DETAILED DESCRIPTION OF THE EMBODIMENTS

The method according to the present invention will now be described with reference to the annexed Figures.

Figure 1:
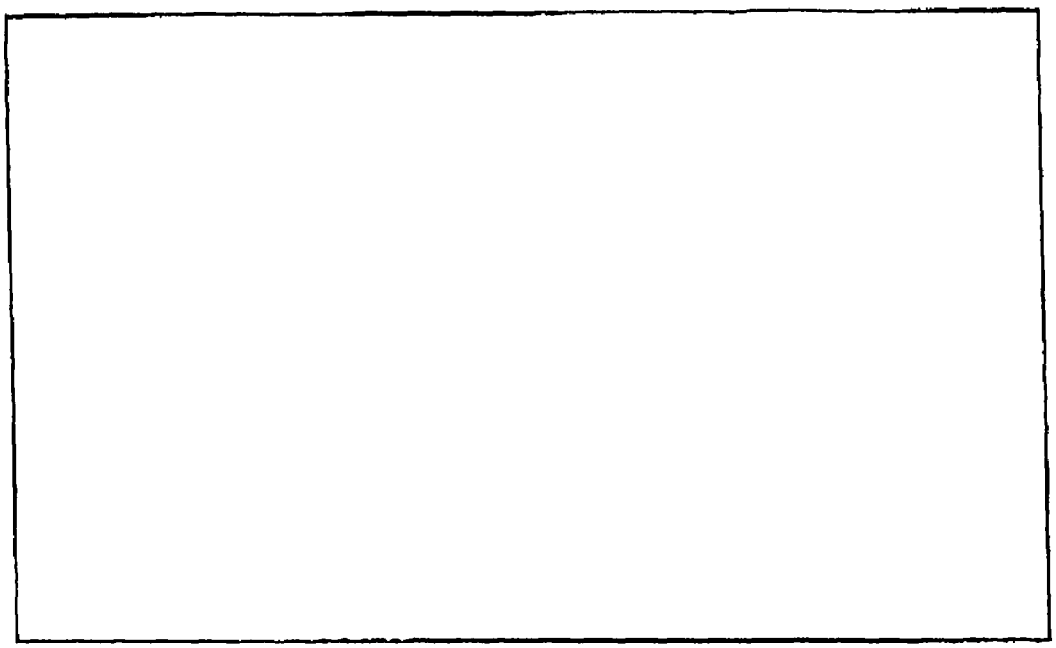
FIG. 1 shows a starting sheet.
Figure 2:
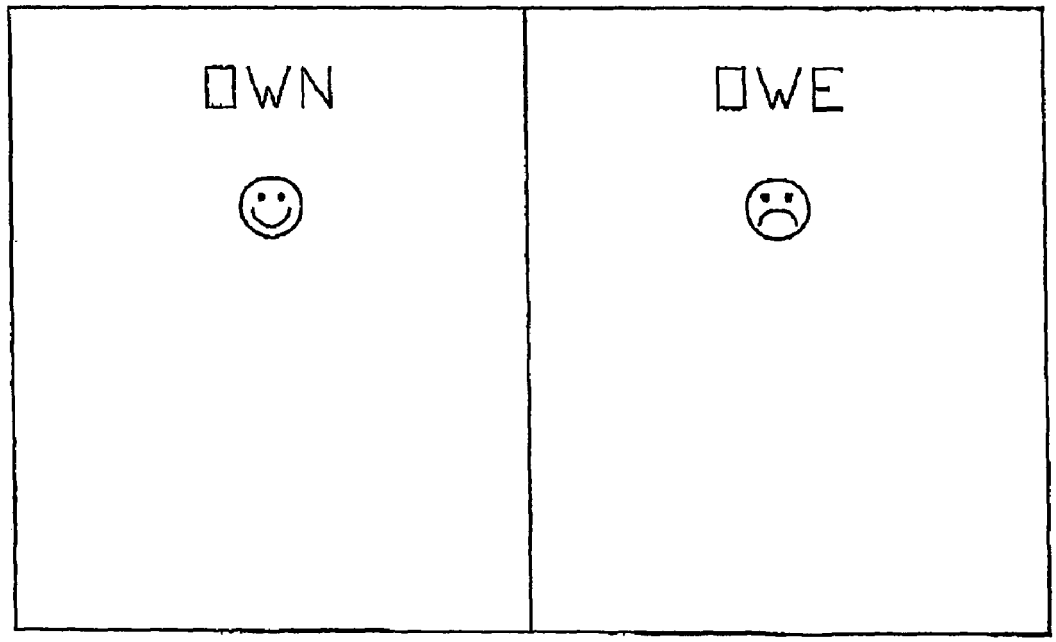
FIG. 2 shows a marked up version of the starting sheet of FIG. 1 after a first step of the teaching method has been carried out.

In FIG. 1, students are presented with a blank sheet 10 representing a situation before any transactions are conducted in a business. In FIG. 2, students divide the sheet 10 into halves by means of a vertical line and write "owe" and "own" on opposite sides of the line. The happy and sad faces are to indicate whether entries on opposite sides of the line are "good" or "bad". Specifically owning something is good, owing something is bad.

In the next step, as shown in FIG. 3, students are then provided with "bank notes" of different colors representing amounts owed and the value of things owned. Students record transactions in a diary, which represents a traditional accounting journal. Lastly, in FIG. 4, the last item provided to the students is a transaction diary 14. The transaction diary 14 has entered in it, in narrative non-accounting format, a description of the events that are being "accounted for" by the student.

Students are now ready to start learning accounting concepts. The first concept is that of the bank balance. FIG. 5 demonstrates that the bank balance will be R9400 if the money "owned" is R10000 and the money "owed" is R600. The concept of a notional basket for containing assets, liabilities etc. is introduced. This concept is intended to assist the student in grasping that in accounting like must be kept with like. Eventually the concept of a "basket" converts to an understanding by the student of the concept of accounts of various types.

As shown in FIG. 6, the initial borrowing of working capital is then dealt with. The asset of R110,000 is shown on the owned side of the line (by the business) and is balanced by the owe liability on the other side of the line. The types of money discussed with respect to FIG. 3 are placed on opposite sides of the line 12 as visual representations of owe and own.

Figure 7:
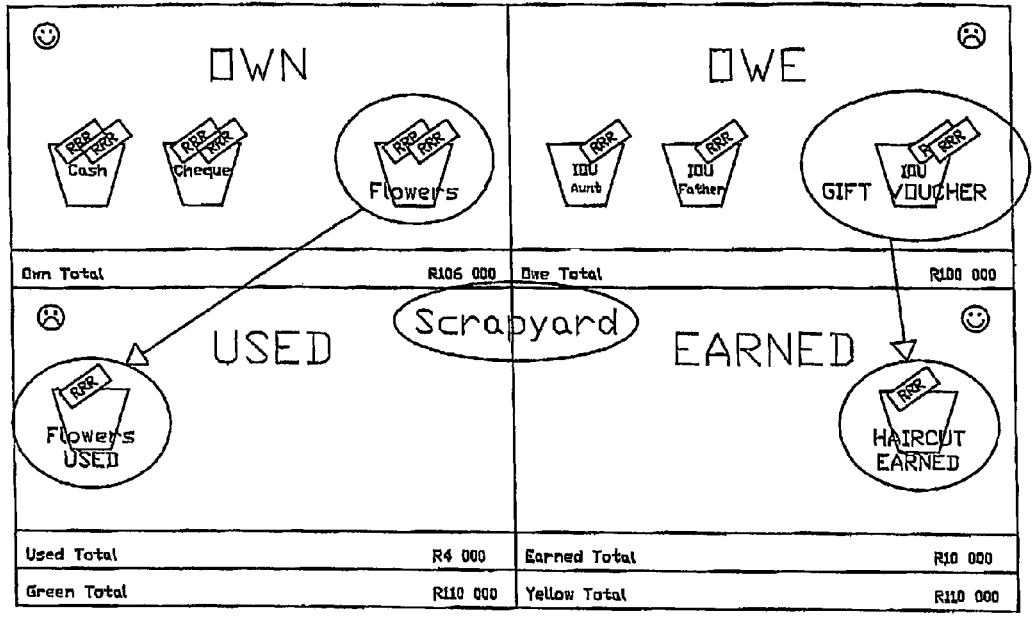
FIG. 7 shows the physical relationships between asset and liability transactions.
Figure 8:
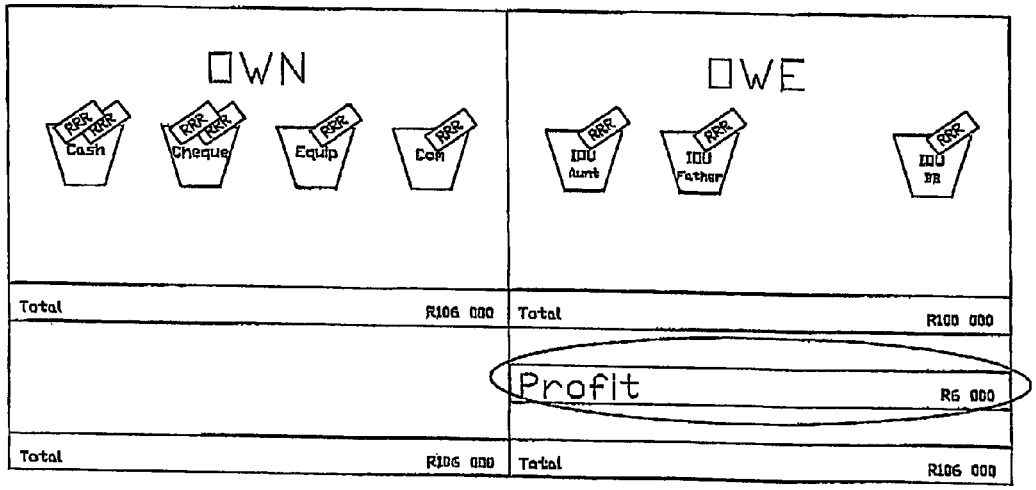
FIG. 8 shows an introduction to the concept of "profit" being the difference between what is owned and what is owed.
Figure 15:
Figure 16:

The concept introduced in FIG. 7 is that of a physical place in which transactions occur. These transactions alter the assets and liabilities in the work place, has been designated a "scrapyard" and results in profits or losses. Eventually the concept of these changes occurring over a period of time converts in the student's mind to an income statement.

FIGS. 8-11 show the concept of "profit" being the difference between what is owned and what is owed. Thus, the student's view of owe and owned is merely changed to the more usual concepts of assets and liabilities. What is demonstrated is how income and expenditure are used to give profit.

FIG. 12 depicts a way in which a balance sheet at a specific date is created. A student is shown that accounts are taken out and balanced at predetermined intervals. Closing balances of one accounting period are carried forward as opening balances of the next accounting period.

FIGS. 18 to 21 disclose decision trees, which are used to elucidate the decision process which is applied to each transaction to determine what type of transaction it is, whether it influences the balance sheet or income statement, and whether it results in an increased or decrease in whichever basket the amount is allocated to. The transactions are accompanied by the placing of notes (FIG. 3) of the appropriate color and value to show that there is an increase or a decrease in the value of the asset, liability, etc.

Figures 17, 18:
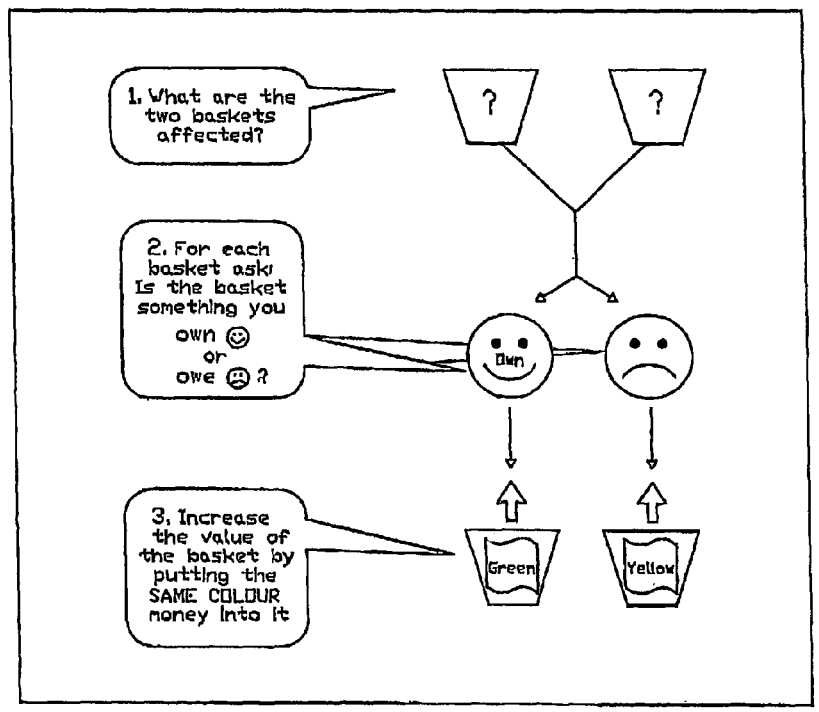
Figure 19:
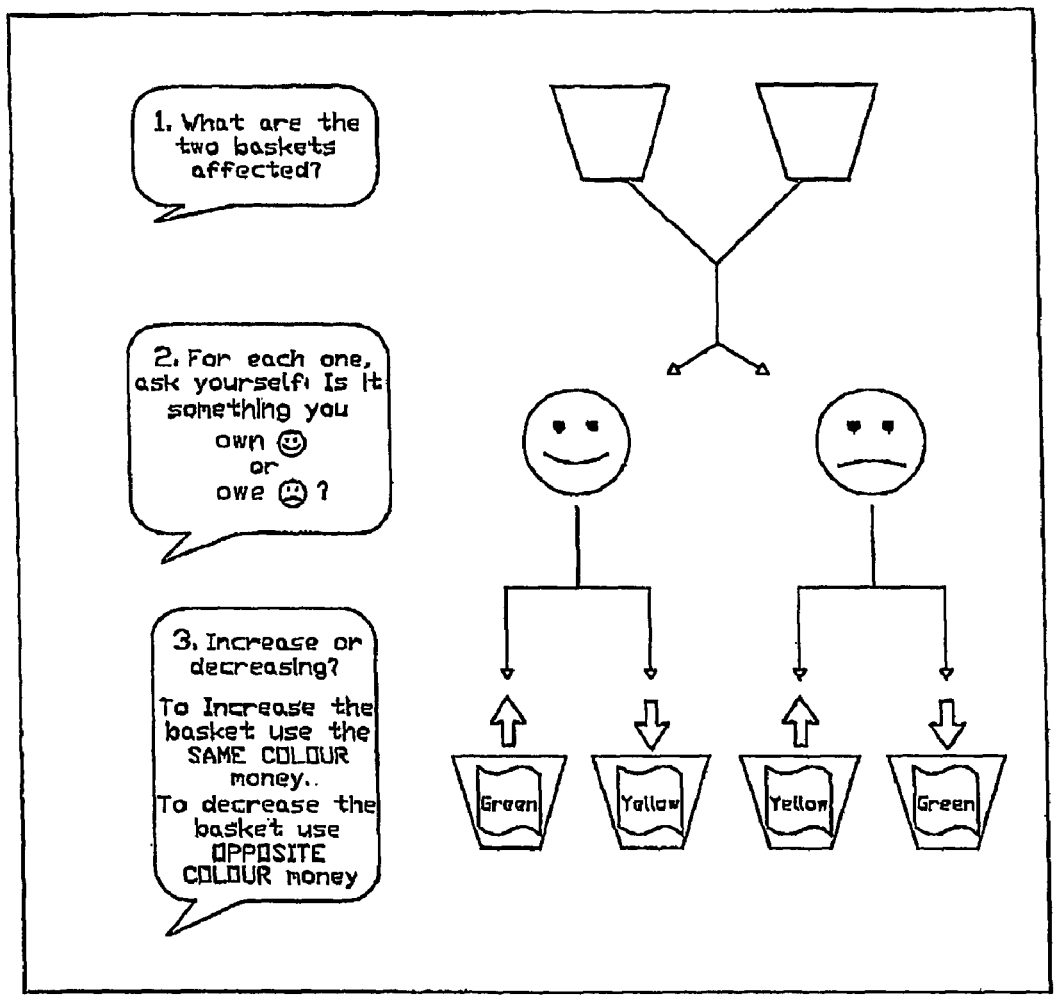
FIG. 19 shows a decision tree that is used to elucidate a decision making process for increasing or decreasing a value of a basket.
Figure 20:
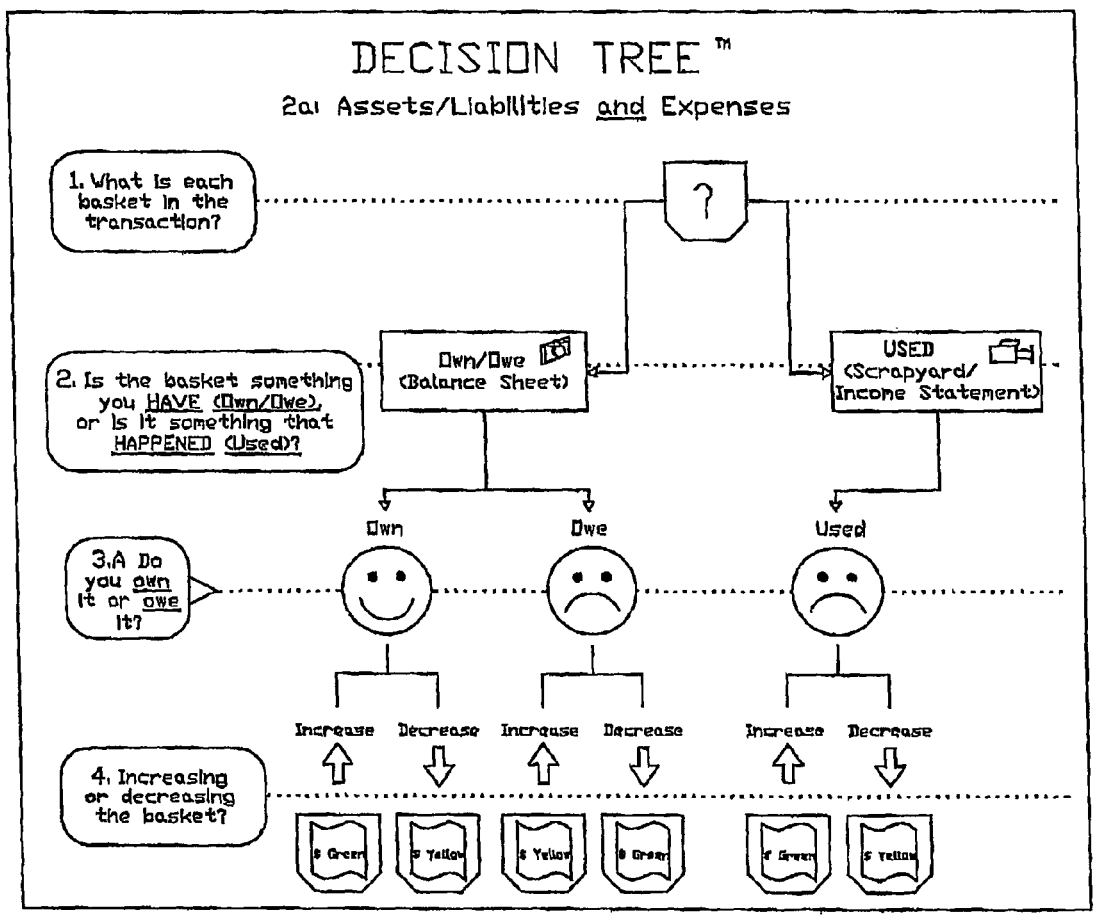
FIGS. 20 and 21 show decision trees that are used to elucidate a decision which is applied to each transaction to determine what type of transaction it is.
Figure 21:
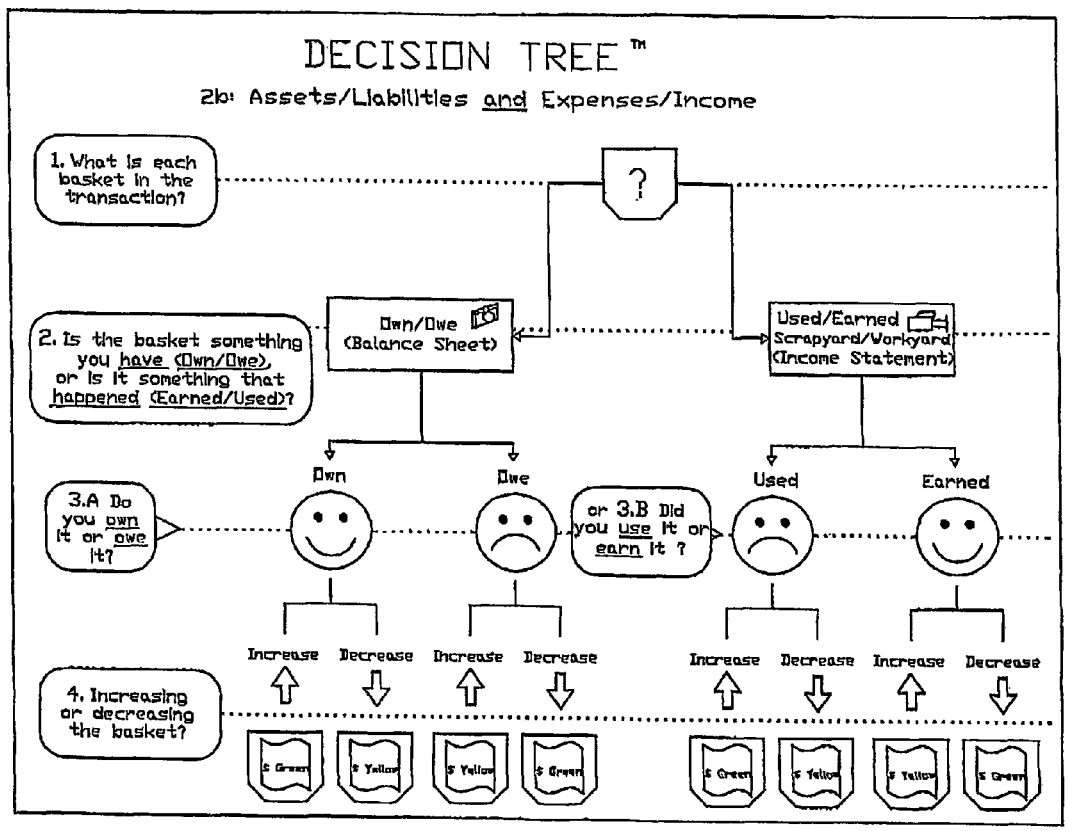

In FIG. 18, a person would first ask what are the baskets that are affected. Then, for each basket, it is determined whether the basket is something that you own, which is represented by a smiley face, or owe, which is represented by a sad face. Lastly, it is demonstrated that the value of each basket is increased by putting a colored money (ticket) in a basket having the same color. The decision tree of FIG. 19 shows the same first two steps of FIG. 18; however, the last step is intended to determine whether the value of the basket is increasing or decreasing. As in FIG. 18, to increase the basket, a person must place colored money, i.e., a colored ticket, in the basket having the same color as the ticket. To decrease the value of a basket, a person must place colored money, i.e., a colored ticket, in the basket having the opposite color as the ticket.

While the sheets on which the Figures are drawn and the notes can be physical elements, it is also possible for the system to be computerized. Each Figure is then available as a computer screen and the program can be programmed to enable visual images of notes of appropriate value and color to be brought onto the screen as required.

The invention claimed is:

1. A computerized process for teaching accounting principles, a computer executing the steps of a program recorded on a non-transitory computer-readable medium, the program executing the computerized process comprising:

displaying on a computer screen a first ticket icon representing a first ticket having a first color and displaying on the computer screen a second ticket icon representing a second ticket having a second color;

bifurcating the computer screen into two halves, a first half comprising the first color and a second half comprising the second color;

displaying on the computer screen a first bucket icon and a second bucket icon, assigning the display of each bucket icon to either the first half or the second half of the computer screen, wherein each bucket icon is colored to match the color corresponding to the half of the screen upon which it is displayed, and wherein the first and second ticket icons each has an associated respective value and the first and second bucket icons each has an associated respective value; and determining a computer-calculated change in associated value of either of the two bucket icons resultant from placing the first or the second ticket icon in one of the bucket icons, wherein the change in associated value is an increase in the respective associated value of either of the two buckets if the bucket icon is the same color as the ticket icon that is placed therein, and the change is a decrease in respective associated value if the bucket icon is a different color from the ticket icon that is placed therein.

* * * * *